United States Patent [19]
Beckhoff

[11] Patent Number: 6,167,425
[45] Date of Patent: Dec. 26, 2000

[54] SYSTEM FOR IMPLEMENTING A REAL TIME CONTROL PROGRAM IN A NON-REAL TIME OPERATING SYSTEM USING INTERRUPTS AND ENABLING A DETERMINISTIC TIME CHARING BETWEEN THE CONTROL PROGRAM AND THE OPERATING SYSTEM

[76] Inventor: Hans Beckhoff, Weidenweg 58, D-33415 Verl, Germany

[21] Appl. No.: 08/974,993

[22] Filed: Nov. 20, 1997

[30] Foreign Application Priority Data

Nov. 22, 1996 [DE] Germany ............... 196 48 422

[51] Int. Cl.$^7$ ...................................... G06F 9/00
[52] U.S. Cl. ................ 709/103; 709/100; 709/102; 709/107; 709/329; 710/260; 713/502; 703/26
[58] Field of Search ................... 395/670, 672, 395/673, 674, 677, 733, 734, 737, 739, 183.08; 364/528.31; 709/1–5, 8, 100, 102, 103, 107, 329; 710/260–266; 713/502; 703/26

[56] References Cited

U.S. PATENT DOCUMENTS

| | | | |
|---|---|---|---|
| 5,193,189 | 3/1993 | Flood et al. ............... | 709/103 |
| 5,291,614 | 3/1994 | Baker et al. ............... | 712/35 |
| 5,535,380 | 7/1996 | Bergkvist, Jr. et al. ........ | 713/502 |
| 5,640,563 | 6/1997 | Carmon ................... | 709/102 |
| 5,694,604 | 12/1997 | Reiffin .................... | 709/107 |
| 5,721,922 | 2/1998 | Dingwall .................. | 709/103 |
| 5,742,825 | 4/1998 | Mathur et al. .............. | 709/329 |
| 5,768,599 | 6/1998 | Yokomizo .................. | 710/260 |
| 5,995,745 | 11/1999 | Yodaiken .................. | 703/26 |

FOREIGN PATENT DOCUMENTS

| | | |
|---|---|---|
| 0400500 | 5/1990 | European Pat. Off. . |
| 2651051 | 8/1990 | France . |
| 3831048 | 9/1988 | Germany . |
| 4406094 | 2/1994 | Germany . |

OTHER PUBLICATIONS

Mark Haese, "Echzeit für Windows", Design & Elektronik 2, Feb. 6, 1996, p. 24.

"Fenster zum Prozess", Elektronik Praxis, No. 8, Apr. 28, 1994, pp. 64–66.

Paul G. Caspers, Aufbau von Betriebsstemen, Walter de Gruyter, Berlin, 1974, pp. 66–71.

Gerd Hoppe, Die Industrie setzt sunehmend auf PC–kompatible Steurungstechnik, etz, Heft 15–16, 1996, pp. 6–9.

Mainrad Happacher, "Nicht aufzuhalten", Elektronik 16, 1996, pp. 40–47.

Jean Lud montamat et al., "PC steuert CNC", maschine+werkzeug 7–8, 1996, pp. 50–52.

"Kompakt ist Trumpf", fertigung, Sep. 1996, p. 60.

"Offene Steuerung mit Windows", fertigung, Dec. 1994, pp. 32–34.

Meinhard Wrobel, "Windows windustrietauglich aufrüsten", elektronik 17, 1993, pp. 95–100.

Ralf Steinmetz, "Analyzing the Multimedia Operating System", IEEE MultiMedia, Spring 1995, pp 68–89.

*Primary Examiner*—Meng-Ai T. An
*Assistant Examiner*—Nabil El-Hady
*Attorney, Agent, or Firm*—Dorsey & Whitney LLP

[57] ABSTRACT

The invention pertains to a method and apparatus for implementing a real time control program in a non-real time operating system running on a processor of a PC system, wherein a change of environment from the non-real time operating system to the real time control program and a change of environment from the real time control program to the non-real time operating system are carried out by means of interrupt calls of an internal interrupt source of the PC system in an operating cycle so that run times are allocated to both the real time control program and the non-real time operating system in an operating cycle.

29 Claims, 3 Drawing Sheets

FIG. 3

| |
|---|
| STEP: 1<br>PROGRAMMING OF TIMER 0 |

| |
|---|
| STEP: 2<br>OVERWRITING OF THE INTERRUPT VECTOR IN THE INTERRUPT VECTOR TABLE |

| |
|---|
| STEP 2a:<br>PROTECTION AGAINST REPROGRAMMING |

| | |
|---|---|
| STEP 3:<br>RUN TIME REACTION IN AN OPERATING CIRCLE | STEP 3a:<br>CHANGE OF ENVIRONMENT FROM WINDOWS NT TO THE REAL TIME PROGRAM |
| | STEP 3b:<br>CHANGE OF THE REAL TIME PROGRAM TO WINDOWS NT |

| |
|---|
| STEP 4:<br>BREAK OF THE REAL TIME PROGRAM |

SYSTEM FOR IMPLEMENTING A REAL TIME CONTROL PROGRAM IN A NON-REAL TIME OPERATING SYSTEM USING INTERRUPTS AND ENABLING A DETERMINISTIC TIME CHARING BETWEEN THE CONTROL PROGRAM AND THE OPERATING SYSTEM

BACKGROUND OF THE INVENTION

The invention relates to a method for implementing a real time control program in a non-real time operating system and to an apparatus for performing such a method.

Controlling systems are employed in an increasing extent in personal computers ("PCs") to achieve automation of machines and production plants. The essential advantage of PC-based controlling systems compared to prior art stored-program control solutions (SPS/CNC) is the possibility to use commonly effective computer standards which are pre-set by international norms and which have been very successful in use. Consequently, on the one side a cost saving control solution is provided. On the other side, the use of the most recent PC technique caused by the short innovation cycles in PC development is ensured.

As a first step to use PCs for automation systems, special PC assemblies are integrated into known SPS/CNC-control systems. However, the use of additional external PCs, in particular for displaying and listing of control operations, results in costly and expensive control systems.

A more promising approach for the use of PCs for controlling operations is the integration of SPS/CNC functions into the PCs themselves. The extremely fast and continuous increase of the capability of PC processors in the recent years made it possible to simultaneously carry out controlling operations in real time, i.e., the processing of information at the same time and with the same speed as they occur, and to manage usual PC functions by means of a single processor. This solution enables cost saving as well as an improved flexibility to adapt the control operation to the desired applications.

To perform real time control operations by means of a PC, it is necessary to provide all occurring tasks with a sufficient calculating time to enable stable process control. In detail, cyclic processing of a control task has to be performed without any time fluctuation, i.e., with a jitter in the range of a some microseconds and a predictable latency time, i.e., a response time of the controlling device on a control demand.

Under ideal conditions no additional operating system for real time tasks has to be implemented on the PC but the operating system implemented to carry out the usual PC functions simultaneously performs the real time control. However, almost no known operating system meets the above-mentioned real time requirements. This applies in particular to the standard operation systems for PCs produced by Microsoft. The Windows operating systems, in particular, are not suitable for real time tasks because interruption calls occurring in these operating systems do not have a direct access to the PC processor. In case a Windows operating system should execute a control task on a PC processor, a virtual computer management system retrieves a resource allocation of the processor after the interrupt call. This intermediate virtualising, however, substantially increases the latency time, in particular in case interrupts having a higher priority stop than a previous interrupt call. Moreover, the stability of the latency time of Windows operating systems, which is essential for control tasks, is not guaranteed because said operating systems have a reaction time depending on the kind of interrupt call. Since Windows operating systems, however, are the platforms having the largest application software supply, it would be desirable to carry out real time tasks when operating such operating systems.

From DE 44 06 094 A1 it is known to ensure the real time performance of a control program by carrying out a complete change of environment from the non-real time operating system to the real time control system by means of a direct access to a non-maskable interrupt (NMI) of the processor. This change of environment by means of the non-maskable interrupt requires an additional hardware for the PC system to generate the calls of the non-maskable interrupt. Moreover, the method according to DE 44 06 094 A1 does not have any information on the current condition of the operating system to that this operating system also stops critical code segments which have to be processed without any break to avoid instabilities of the operating systems. This applies in particular if the method according to DE 44 06 094 A1 is used for the operating system Windows NT which is most suitable for complex automation operations. This operating system uses the non-maskable interrupt for "fatal" hardware errors of the processor. The call of a non-maskable interrupt provides therefore a stop condition including a system status signal. Since the operating system kernel of Windows NT always expects a stop condition when calling the non-maskable interrupt, the use of said non-maskable interrupt to perform change of environment in order to achieve real time operation is not advisable. Finally, the method according to DE 44 06 094 A1 only determines the entry into the operating system by means of the non-maskable interrupt. However, no defined end of the control program is provided so that in the worst case no run time is left over for the operating system until the next call of the control program.

SUMMARY OF THE INVENTION

It is therefore an object of the present invention to provide a method and an apparatus for implementing a real time control program in a non-real time operating system, which allows real time applications employed on the non-real time operating system without decreasing the stability of the operating system.

This object is met by a method for implementing a real time control program in a non-real time operating system on a processor of a PC system, wherein a change of environment from the non-real time operating system to the real time control program and a change of environment from the real time control program to the non-real time operating system are carried out by means of interrupt calls of an internal interrupt source of the PC system, whereby run times are allocated to both the real time control program and the non-real time operating system in an operating cycle.

Furthermore, the object is also met by an apparatus for implementing a real time control program in a non-real time operating system on a PC processor comprising an internal interrupt source, means connected to said internal interrupt source for performing in an operating cycle of the PC system, a change of environment from non-real time operating system to the real time control program and a change of environment from the real time control program to non-real time operating system in accordance with the interrupt calls of the interrupt source, whereby run times are allocated to both the real time control program and the non-real time operating system in an operating cycle.

According to the invention a deterministic time sharing between the real time control program and the non-real time operating system is carried out. This means that the real time control program carries out its tasks on the processor of the PC at instants which are acceptable for the non-real time operating system.

To achieve such a deterministic reaction, according the invention, two interrupts are initiated for each operating cycle, wherein one interrupt performs a change of environment from the non-real time operating system to the real time control program and the other interrupt performs a change of environment from the real time control program to the non-real time operating system, whereby run times are allocated to both the real time control program and the non-real time operating system in an operating cycle. The required interrupt calls for triggering the interrupt routines are performed from an internal interrupt source of the PC system, wherein according to a preferred embodiment the timers of the PC system which cause the system clock calls, i.e., for example the timer 0, are used therefor.

According to the invention the operating cycle of the PC system is freely adjustable whereby the cycle time is selected preferably from a range of 0.1 msec to 1 msec in order to ensure a stable program run of said real time control program and said non-real time operating system.

Moreover, according to the invention, the ratio of the run time of the real time control program and the run time of the non-real time operating system is adjustable, wherein a minimum run time is allocated to the non-real time operating system. This enables a most favorable distribution of the calculating capacities of the PC processor to both the control tasks and the normal PC functions. The allocation of a minimum run time to the non-real time operating systems guarantees the stability thereof. Furthermore, the run time ratio can be continuously modified during the processing of the real time control program to perform a required adaptation of the real time operation, for example to an increased real time load.

According to the invention, a stable implementing of a real time control program in a non-real time operating system on a processor is achieved, wherein it is in particular guaranteed, that time critical tasks of the operating system, e.g. a network operation, a hard disk operation or a COM-port operation, are reliably processed without an interrupt. Moreover, no additional hardware for the PC system to perform the control tasks is necessary since the PC resources managed by the non-real time operating system are simultaneously employed to carry out real time operations of the control program.

To ensure a reliable real time processing, according to the preferred embodiment of the invention, security measures against an undesired re-programming in particular of the internal interrupt source of the PC system are provided. When the operation cycle on the PC system is installed, the security measures prevent changes of the timing of the interrupt calls of the internal interrupt source until the end of processing of the real time control program or an external stop of this real time control program.

When using the operation system Windows NT, the problem arises that a re-triggering of the service routine of the time clock is carried out immediately after the regular triggering thereof to achieve an improved distribution of the system load. According to the invention, such a re-triggering is identified and an undesired call of the real time control program initiated by the re-triggering is prevented.

The invention enables to provide non-real time operating systems with real time features in an open and compatible manner and therefore a PC which carries out "hard" and effective real time processing in all fields of automation without the need for additional large-scale operation systems and co-processor cards. This applies in particular for the standard operating systems produced by Microsoft and especially to the operating system Windows NT.

BRIEF DESCRIPTION OF THE DRAWINGS

The invention will be described further by way of examples with respect to the operating system Windows NT.

FIG. 3 shows a flow diagram for implementing a real time control program in the non-real time Windows NT operating system.

DESCRIPTION OF THE PREFERRED EMBODIMENT

Figure 1:
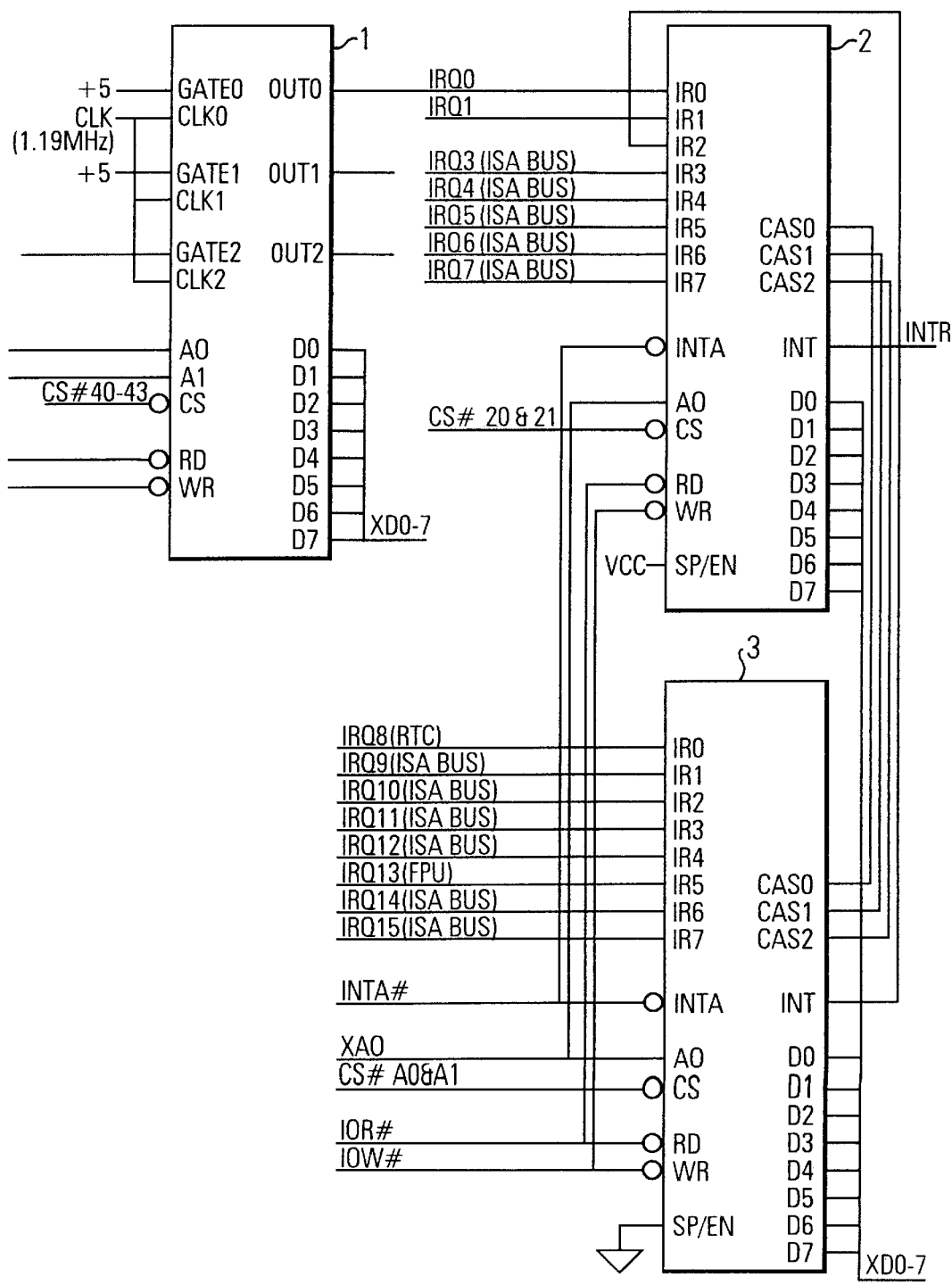
FIG. 1 shows a part of a PC system with a timing clock system and an interrupt control system in a block switching diagram.

As shown in FIG. 1, systems circuits of a PC comprise a timer system 1 with a time 0 (OUT0) used as a system timer. Interrupt calls are usually transmitted by said time 0 via an interrupt line IRQ0 to an interrupt control system comprising two interrupt controllers 2, 3 which triggers an interrupt at said process via a processor line INTR.

Figure 2:
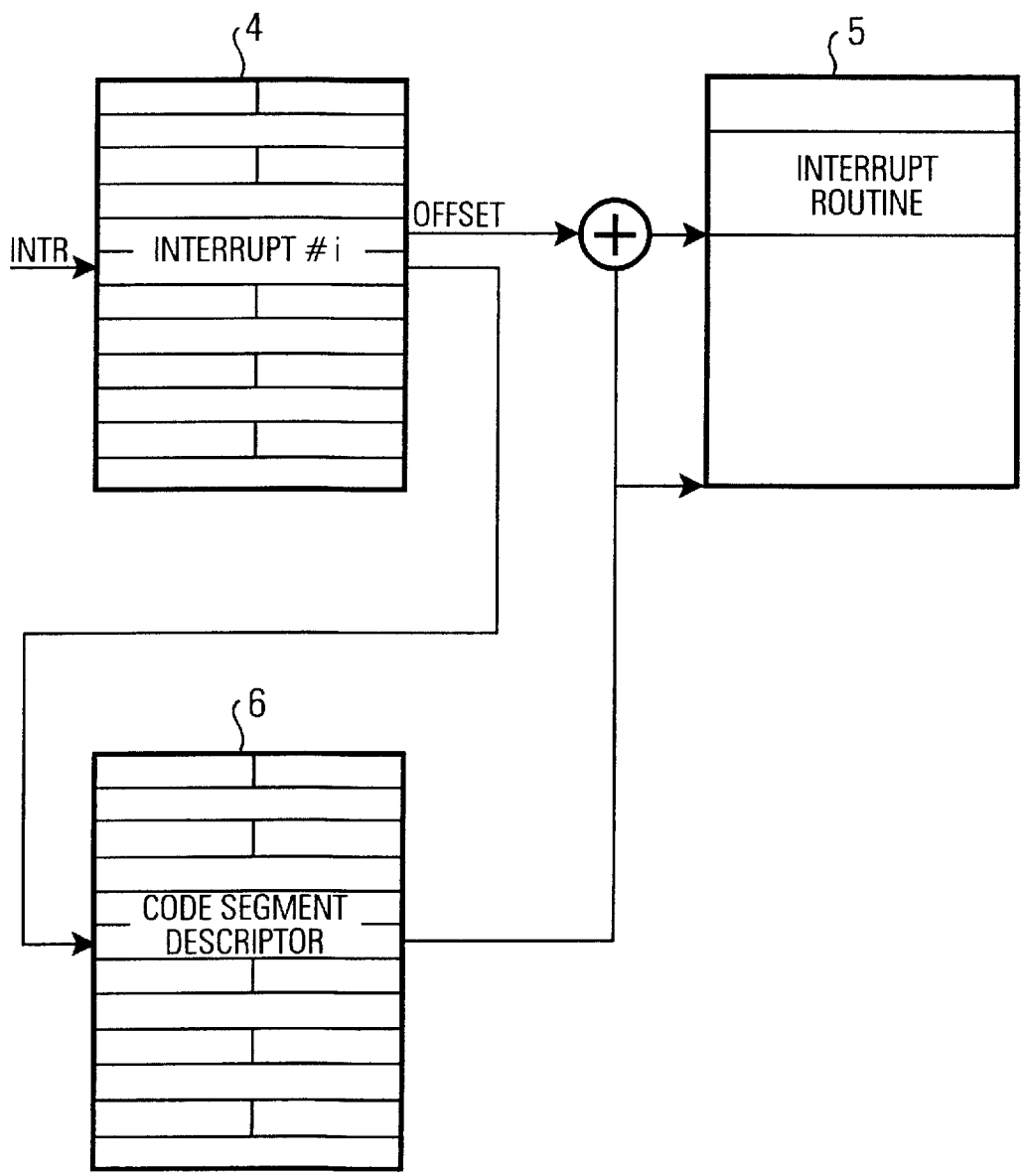
FIG. 2 shows a part of an interrupt system of the PC system.

As shown in FIG. 2, the processor uses an interrupt number included in the interrupt signal as an index for an interrupt vector table 4 and reads the corresponding descriptor which includes a selector and an offset. The selector is used as an access key to the code segment descriptor in a global or local descriptor table 5. This enables the processor to derive the code segment in a storage 6, which includes the interrupt routine for the triggered interrupt. The offset is used as entry point into this code segment and presents the start address of the interrupt routine. In the Windows NT operating system, the system clock routine is usually triggered by an interrupt call of the time 0.

As shown in FIG. 3, according to the invention, in a first step (step 1) the timer 0 is set to the desired operating cycle, preferably in a range of 0.1 msec to 1 msec by means of multi-media timer resolution using equal calls for Windows NT functions. The timer 0 generates predictable interrupt calls which are stored as an interrupt vector INT30H in the interrupt vector table 4. This interrupt vector is overwritten according to the invention (step 2) so that the vector presents the address of the implementing routine stored in the storage 6. Moreover, calls of the Windows NT operating system for reprogramming of the timer 0 are prevented until an end of run or a stop of the real time control program (step 2a).

The timer 0 determining the operating cycle of the PC system generates after reprogramming two interrupt calls for each operating cycle. The time intervals between two interrupt calls are adjustable so that any time ratio can be freely set in the order of the interrupt calls in a operating cycle. The implementing routine always triggers a change of environment from the Windows NT operating system to the real time control program at the first interrupt call (step 3a) and a change of environment from the real time control program to the Windows NT operating system at the second interrupt call (step 3b). To achieve a change of environment from the control program to the Windows NT operating system, the system clock routine is used. During the processing of the control program the time ratio between the interrupt calls of the timer 0 is infinitely variable. However, a minimum run time for the Windows NT operating system is guaranteed to avoid instability of the time critical functions of the Windows NT operating system.

Furthermore, when using the Windows NT operating system in connection with the real time processing, the problem arises that the operating system often recalls the service routine of the timer 0 shortly after a regular call of the service routine of timer 0 to improve the system load distribution. According to the invention, these recalls by the Windows NT operating system are identified and an undesired triggering of the real time control program is prevented.

After the control program is processed or stopped, the original interrupt vector INT30H is re-written into the interrupt vector table 4 so that the vector points again to the system clock routine of the Windows NT operating system when timer 0 interrupts are released. Furthermore, the blockade against reprogramming of timer 0 is lifted, whereby the Windows NT operating system can re-establish its original reaction carried out before implementing the real time control program (step 4).

The invention enables a deterministic time distribution between the real time operating system and the Windows NT operating system which is carried out synchronously to the system clock. According to the invention, it is possible to implement all kinds of control programs in the Windows NT operating system without changing the features of the program.

The invention, however, is not only applicable for the Windows NT operating system but also for all other non-real time operating systems.

What is claimed is:

1. A method for implementing a real time control program in a non-real time operating system on a processor of a PC system,
    wherein at least two interrupts are initiated for each operating cycle of the PC system by means of at least two interrupt calls of an internal interrupt source of the PC system,
    one of said interrupt calls triggering the change of environment from the non-real time operating system to the real time control program and another of said interrupt calls triggering the change of environment from the real time control program to the non-real time operating system,
    whereby run times are allocated to both the real time control program and the non-real time operating system in each operating cycle, thereby enabling a deterministic time sharing between the real time control program and the non-real time operating system, and
    wherein the non-real time operating system is provided with substantially minimum run time.

2. The method according to claim 1, wherein the operating cycle is freely adjustable preferably in a range of 0.1 msec to 1 msec.

3. The method according to claim 1, wherein a ratio between the run time of the real time control program and the run time of the non-real time operating system is freely adjustable.

4. The method according to claim 1, wherein the internal interrupt source is a timer of the PC system which sets the system clock by means of interrupt calls.

5. The method according to claim 4, wherein the triggering of a service routine of the timer caused by non-real time operating system to initiate an interrupt call for the system clock is identified and a start of the real time control program is prevented.

6. The method according to claim 4, wherein the operating cycle is set by the definition of the order of interrupts of the timer.

7. The method according to claim 6, wherein the timer includes two alternating time intervals for triggering successive interrupt calls, said time intervals determining the ratio between the run time of the real time control program and the run time of the non-real time operating system.

8. The method according to claim 1, wherein after installation of the operating cycle on the PC system including a change of environment from the non-real time operating system to the real time control program and a change of environment from the real time control program to the non-real time operating system, a change of the interrupt calls of the corresponding internal source is prevented until the real time control program is ended or stopped.

9. The method according to claim 7, comprising the steps of determining the time intervals between the interrupt calls of the timer;
    overwriting an interrupt vector corresponding to the interrupt call of the timer and addressing a system clock routine with an interrupt vector addressing an implementing routine;
    protecting the definition of the time intervals of the timer against reprogramming by the non-real time operating system; and
    processing, in accordance with the interrupt calls of the timer, the real time control program including alternate triggering of the real time control program and the system clock routine of the non-real time operating system by means of the implementing routine.

10. An apparatus for implementing a real time control program on a non-real time operating system on a PC processor, comprising
    an internal interrupt source for initiating at least two interrupts for each operating cycle by means of at least two interrupt calls,
    means connected to the internal interrupt source for performing, in each operating cycle of the PC system, a change of environment from the non-real time operating system to the real time control program in accordance with one of said interrupt calls of the internal interrupt source and a change of environment from the real time control program to the non-real operating system in accordance with the other interrupt call of the internal interrupt source, whereby run times are allocated to both the real time control program and the non-real time operating system in each operating cycle enabling a deterministic time sharing between the real time control program and the non-real time operating system,
    wherein the non-real time operating system is provided with a substantially minimum run time.

11. The apparatus according to claim 10, wherein the internal interrupt source is a timer of the PC system which determines the system clock by means of interrupt calls.

12. The apparatus according to claim 11, wherein the timer is programmable and means for setting the time intervals between the interrupt calls of the timer are provided.

13. A method of using an implementation routine for implementing a real time control program in a non-real time operating system on a processor of a PC system, wherein a change of environment from a non-real time operating system to a real time control program and a change of environment from the real time control program to the non-real time operating system are carried out by means of at least two interrupt calls of an internal interrupt source of the PC system in each operating cycle of the PC system, whereby run times are allocated to both the real time control program and the non-real time operating system in each of said operating cycles, wherein a ratio between the run time of the real time control program and the run time of the non-real time operating system is freely adjustable, and wherein the non-real time operating system is provided with a substantially minimum run time.

14. The method of claim 13, wherein the operating cycle is freely adjustable preferably in a range of 0.1 msec to 1 msec.

15. The method of claim 13, wherein the internal interrupt source is a timer of the PC system which sets the system clock by means of interrupt calls.

16. The method of claim 15, wherein the triggering of a service routine of the timer caused by the non-real time operating system to initiate an interrupt call for the system clock is identified and a start of the real time control program is prevented.

17. The method of claim 15, wherein the operating cycle includes two interrupt calls of the timer, one of the interrupt calls triggering the change of environment from the non-real time operating system to the real time control program and the other triggering the change of environment from the real time control program to the non-real time operating system.

18. The method of claim 15, wherein the operating cycle is set by the definition of the order of interrupts of the timer.

19. The method of claim 18, wherein the timer includes two alternating time intervals for triggering successive interrupt calls, said time intervals determining the ratio between the run time of the real time control program and the run time of the non-real time operating system.

20. The method of claim 19, comprising the steps of:

determining the time intervals between the interrupt calls of the timer;

overwriting an interrupt vector corresponding to the interrupt call of the timer and addressing a system clock routine with an interrupt vector addressing an implementing routine;

protecting the definition of the time intervals of the timer against reprogramming by the non-real time operating system; and processing, in accordance with the interrupt calls of the timer, the real time control program including alternate triggering of the real time control program and the system clock routine of the non-real time operating system by means of the implementing routine.

21. The method of claim 13, wherein after installation of the operating cycle on the PC system including a change of environment from the non-real time operating system to the real time control program and a change of environment from the real time control program to the non-real operating system, a change of the interrupt calls of the corresponding internal interrupt source is prevented until the real time control program is ended or stopped.

22. A method for implementing a real time control program in a non-real time operating system on a processor of a PC system, wherein an internal interrupt source is a timer of the PC system which sets the system clock by means of interrupt calls, wherein an operating cycle of the PC system is set by the definition of the order of interrupt calls of the timer, and wherein the timer includes two alternating time intervals for triggering successive interrupt calls, said time intervals determining a ratio between the run time of the real time control program and the run time of the non-real time operating system, said method comprising the steps of determining the time intervals between the interrupt calls of the timer;

overwriting an interrupt vector corresponding to the interrupt call of the timer and addressing a system clock routine with an interrupt vector addressing an implementing routine;

protecting the definition of the time intervals of the timer against reprogramming by the non-real time operating system; and processing, in accordance with the interrupt calls of the timer, the real time control program including alternate triggering of the real time control program and the system clock routine of the non-real time operating system by means of the implementing routine, wherein a change of environment from a non-real time operating system to a real time control program and a change of environment from a real time control program to a non-real time operating system are carried out by means of at least two interrupt calls of the timer in each of said operating cycles, whereby run times are allocated to both the real time control program and the non-real time operating system in the operating cycle.

23. The method of claim 22, wherein the operating cycle is freely adjustable preferably in a range of 0.1 msec to 1 msec.

24. The method of claim 23, wherein a ratio between the run time of the real time control program and the run time of the non-real time operating system is freely adjustable.

25. The method of claim 24, wherein the non-real time operating system is provided with a minimum run time.

26. The method of claim 22, wherein the triggering of a service routine of the timer caused by the non-real operating system to initiate an interrupt call for the system clock is identified and a start of the real time control program is prevented.

27. The method of claim 22, wherein the operating cycle includes two interrupt calls of the timer, one of the interrupt calls triggering the change of environment from the non-real time operating system to the real time control program and the other triggering the change of environment from the real time control program to the non-real time operating system.

28. The method of claim 22, wherein after installation of the operating cycle on the PC system including a change of environment from the non-real time operating system to the real time control program and a change of environment from the real time control program to the non-real time operating system, a change of the interrupt calls of the timer is prevented until the real time control program is ended or stopped.

29. A method for implementing a real time control program in a non-real time operating system on a processor of a PC system, wherein at least two interrupts are initiated for each operating cycle of the PC system by means of at least two interrupt calls of an internal interrupt source of the PC system, one of said interrupt calls triggering the change of environment from the non-real time operating system to the real time control program and another of said interrupt calls triggering the change of environment from the real time control program to the non-real time operating system, whereby run times are allocated to both the real time control program and the non-real time operating system in each operating cycle, thereby enabling a deterministic time sharing between the real time control program and the non-real time operating system, wherein a ration between the run time of the real time control program and the run time of the non-real time operating system is freely adjustable, and wherein the non-real time operating system is provided with substantially minimum run time.

* * * * *